United States Patent [19]

Tajima et al.

[11] Patent Number: 4,807,792

[45] Date of Patent: Feb. 28, 1989

[54] PIN BELT TYPE PAPER TRACTOR

[75] Inventors: Akio Tajima; Satoshi Tada, both of Tokyo, Japan

[73] Assignee: Seikosha Co., Ltd., Tokyo, Japan

[21] Appl. No.: 914,126

[22] Filed: Oct. 1, 1986

[30] Foreign Application Priority Data

| | | | |
|---|---|---|---|
| Oct. 7, 1985 | [JP] | Japan | 60-222968 |
| Oct. 7, 1985 | [JP] | Japan | 60-222969 |
| Apr. 2, 1986 | [JP] | Japan | 61-22249 |

[51] Int. Cl.[4] .................. G03B 1/30

[52] U.S. Cl. .................. 226/74

[58] Field of Search .................. 226/74, 75, 80

[56] References Cited

U.S. PATENT DOCUMENTS

| | | | |
|---|---|---|---|
| 2,245,818 | 6/1941 | Pfeiffer | 226/74 |
| 3,908,883 | 9/1975 | Bellisai et al. | 226/74 |
| 4,129,239 | 12/1978 | Hubbard | 226/75 |
| 4,194,660 | 3/1980 | Seitz | 226/74 |
| 4,199,091 | 4/1980 | Hubbard | 226/74 |
| 4,304,345 | 12/1981 | Carlin | 226/74 |
| 4,315,585 | 2/1982 | Seitz | 226/74 |
| 4,344,715 | 8/1982 | Van Horne et al. | 226/74 X |
| 4,693,620 | 9/1987 | Harumatsu | 226/74 X |

*Primary Examiner*—Lenard A. Footland

*Attorney, Agent, or Firm*—Bruce L. Adams; Van C. Wilks

[57] ABSTRACT

A pin belt type paper tractor comprises a drive shaft rotatively driven at the time of feeding a recording paper, a belt driving wheel fitted slidably in the axial direction on the drive shaft for the rotation therewith, and a chassis body for pinching the belt driving wheel from the opposite sides thereof. The chassis is movable in the widthwise direction of a recording paper and is in engagement slidably at its peripheral portion with a fixed support frame having a length not less than the paper width. A rotary member is rotatably supported by the chassis body and an endless belt is engaged between and around the belt driving wheel and rotary member. The endless belt is provided on its outer peripheral surface with a plurality of pins brought into engagement with the perforations of the recording paper. A paper holding cover is pivotably attached to the chassis body in open and close directions.

6 Claims, 5 Drawing Sheets

PIN BELT TYPE PAPER TRACTOR

BACKGROUND OF THE INVENTION

1. Field of the Invention

This invention relates to a paper tractor used in a printer for feeding a recording paper and, more particularly, to the type of paper tractor which employs an endless pin belt having a plurality of pins provided on its peripheral surface which come into engagement with the perforations of the recording paper.

2. Description of the Prior Art

As disclosed in U.S. Pat. Nos. 4129239, 4199091 and 4315585, the typical pin belt type paper tractor known in the art is configured so that it can move in the widthwise direction of the recording paper along two parallel shafts in the form of a drive shaft and a support shaft. A pair of pulleys are rotatably supported on a chassis body, and an endless pin belt is engaged between and around these two pulleys. One of the two pulleys is fitted relatively non-rotatably, but slidably in the axial direction on the drive shaft, and the support shaft passes through the chassis body.

Although the drive shaft and the support shaft must be arranged mutually parallel in parallel to each other, they have inevitably some deviations from the parallel relation owing to errors in manufacture and the like. Hence, in order to assure smooth movement in the axial direction of the tractor even if there exists an error in the parallel relation between the drive shaft and the support shaft, the following configuration is employed. That is, a slider is assembled in the chassis body slidably in the fore and aft direction, and the support shaft passes slidably through this slider.

However, the configuration as described above has the drawbacks that the structure is complicated, the number of parts is increased, the assembly work is troublesome, and hence the manufacturing cost is high.

Further, since back tension is always applied to the recording paper during the printing, if the paper tractor operates at a high speed to feed the recording paper just printed at the time of high-speed printing, the pins of the pin belt become difficult to come off from the perforations of the recording paper, and thus, the endless belt tends to be raised by the recording paper, or the recording paper tends to be torn owing to the timing lag of the pins separating from the recording paper, or the pins sometimes tend to roll up the recording paper while engaging with the perforations to thereby cause jamming.

Each tractor unit can be moved to any position along the drive shaft and the support shaft depending upon the width of the recording paper, and locked at a desired position by means of a clamping mechanism. The clamping mechanism known in the art is movably mounted on the chassis of the tractor unit, and a sleeve with splits is formed on a portion of the slider through which the support shaft passes slidably, and thus, the tractor unit is fixed on the support shaft by tightening the sleeve with splits by means of a fixing lever or fixing screw. Accordingly, additional parts are needed to clamp the track unit at a desired position. In addition, there are the drawbacks that the structure is complicated, the assembly work is troublesome, and the manufacturing cost is high. Furthermore, in clamping the tractor unit, it is necessary to manipulate the fixing lever or fixing screw, hence, if such manipulation is performed carelessly, the tractor unit tends to be displaced during the operation of the printer to thereby cause defective paper feed.

SUMMARY OF THE INVENTION

It is the first object of the present invention to provide a pin belt type paper tractor which is of a simple configuration, can be assembled easily, and can be manufactured at low costs.

It is the second object of the present invention to make smooth separation of pins from the perforations of a recording paper even while an endless pin belt is rotating at a high speed to thereby seed the recording paper stably.

It is the third object of the present invention to provide a paper tractor of a simple configuration which is not in need of extra parts for clamping the tractor unit at a desired position in the widthwise direction of the paper.

To achieve the foregoing first object, the present invention omits a support shaft and employs a drive shaft only. A chassis body holds a belt driving wheel from the opposite sides thereof. The bolt driving wheel is fitted relatively non-rotatably, but slidably in the axial direction on the drive shaft. The chassis body is partly supported by a fixed support frame movably in the widthwise direction of a recording paper.

To achieve the foregoing second object, the chassis body holding from either side the belt driving wheel has a separator provided at a position adjacent to the belt driving wheel on at least one of the marginal portions thereof for guiding the recording paper in the direction effective to separate the perforations of the recording paper from the pins of an endless pin belt which engages with the belt driving wheel and is rotated thereby.

To achieve the foregoing third object, a paper tractor according to the present invention, includes a pair of tractor units shiftable in the widthwise direction of the recording paper. Each of the tractor units is equipped with a paper holding cover has a knurled section provided at a position adjacent to the end portion of the paper holding cover on a fixed member extending in the widthwise direction of the recording paper, and a lock pawl is provided on the end portion of the paper holding cover which is engageable with and disengageable from the knurled section. This lock pawl is designed so that it is locked on the knurled section when the paper holding cover is closed and is disengaged from the knurled section when the paper holding cover is opened. Thus, as the paper holding cover is simply opened and closed at the time of setting the recording paper, inevitably the tractor unit is clamped and released.

DESCRIPTION OF THE PREFERRED EMBODIMENTS

Preferred embodiments of the present invention will now be described with reference to the drawings.

Figure 1:
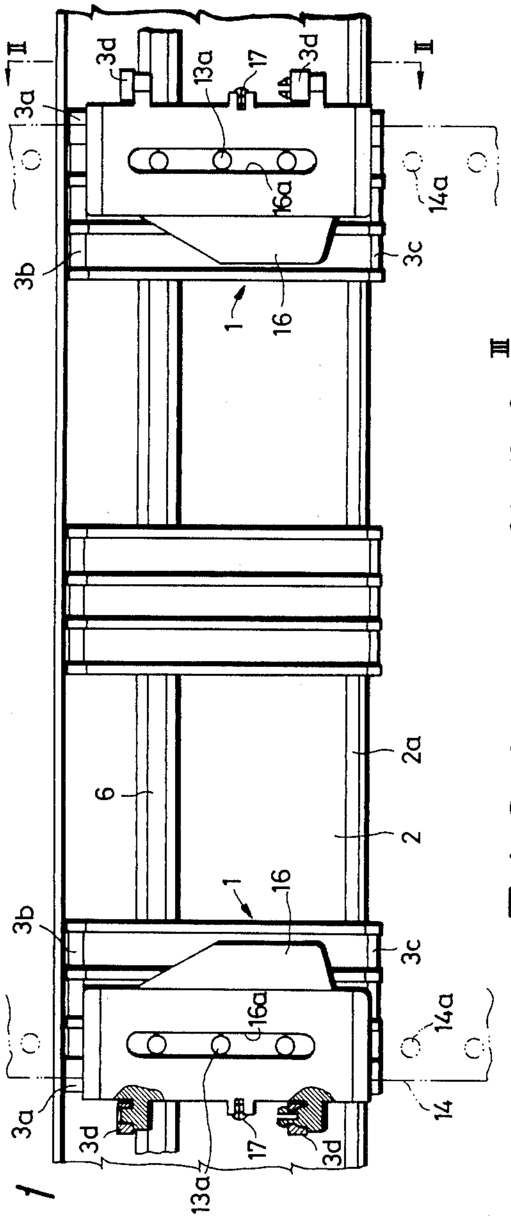
FIG. 1 is a plan view of a first embodiment of a pin belt type paper tractor according to the present invention.

In FIG. 1, a pair of pin belt type paper tractors 1 of laterally symmetrical structure is arranged on a support frame 2. The chassis body of the tractor 1 is, as shown in FIG. 3, composed of two members, i.e. chassis 3a and 3b, and these chassis are coupled into a single body by connecting coupling pawls 4 formed projectingly and integrally on the chassis 3b with a coupling hole 5 bored in the chassis 3a in a manner of snap action.

Figure 3:
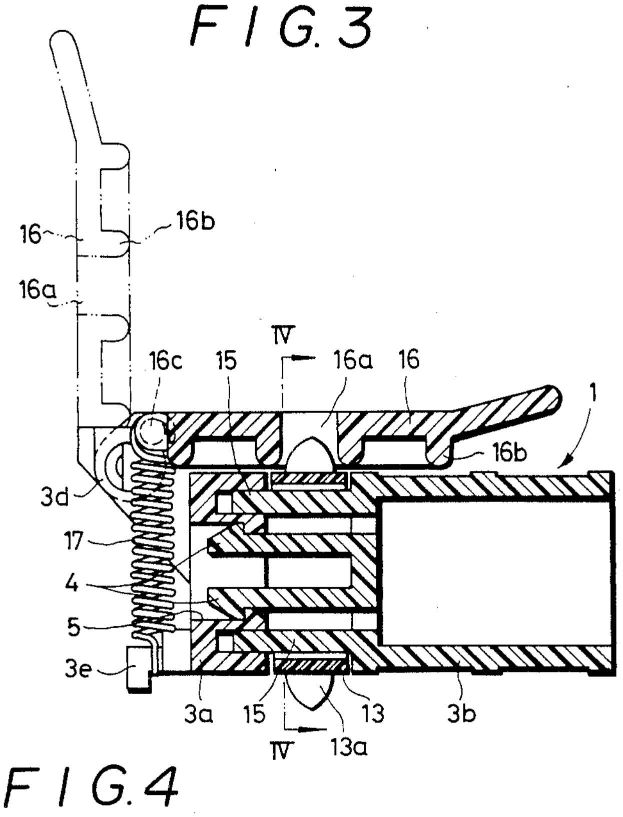
FIG. 3 is a sectional view taken along line III—III in FIG. 2 with a support frame omitted.
Figure 4:
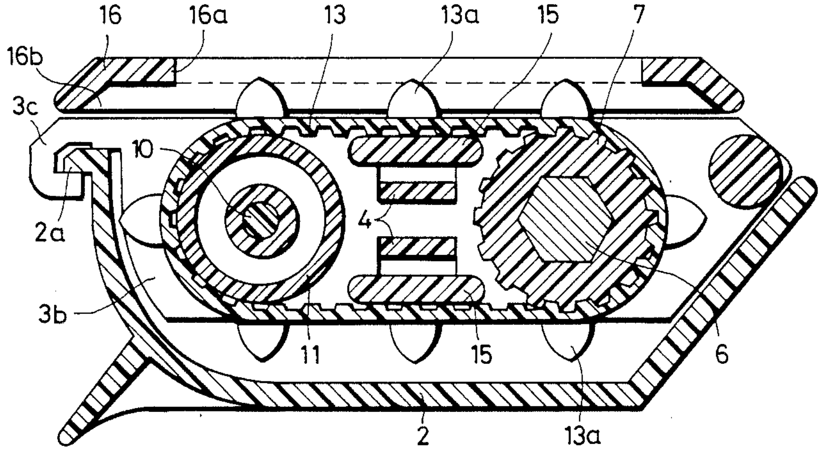
FIG. 4 is a sectional view taken along line IV—IV in FIG. 3.
Figure 5:
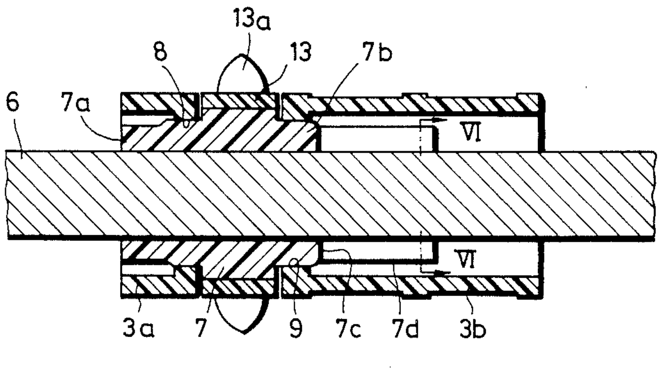
FIG. 5 is a sectional view showing the support structure of a belt driving wheel.
Figure 6:
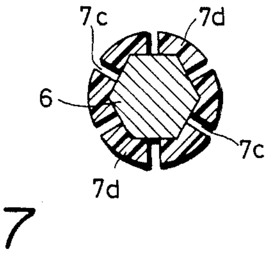
FIG. 6 is a sectional view taken along line VI—VI in FIG. 5.
Figure 7:
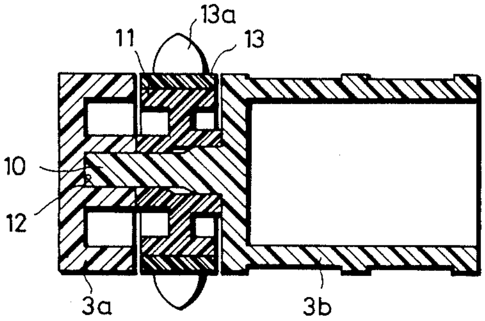
FIG. 7 is a sectional view showing the support structure of a rotary member.

As shown in FIGS. 4 through 6, a belt driving wheel 7 is fitted relatively non-rotatably, but slidably in the axial direction on a drive shaft 6 of a polygonal shape in cross section (hexagonal in cross section in this embodiment). Although not shown, both end portions of the drive shaft 6 are rotatably supported by the support frame 2. The belt driving wheel 7 has sleeves 7a and 7b formed integrally on its opposite end face, with the sleeve 7b having a plurality of resilient segments 7d radially divided by a plurality of slits 7c created in the axial direction. Because these resilient segments 7d are frictionally in resilient contact with the drive shaft 6, the belt driving wheel 7 can move in the axial direction relative to the drive shaft when a force greater than this frictional coupling strength is externally applied. The belt driving wheel 7 is pinched from both sides thereof by the chassis 3a and 3b, and the sleeves 7a and 7b are rotatably fitted in bearing holes 8 and 9 formed in the chassis 3a and 3b. As shown in FIGS. 4 and 7, a rotary member (a pulley) 11 is rotatably supported by a shaft portion 10 formed integrally and projectingly on the chassis 3b, and the end portion of the shaft portion 10 is press-fitted in a hole 12 of the chassis 3a. An endless belt 13 is engaged between and around the belt driving wheel 7 and rotary member 11. The belt driving wheel 7 has on its peripheral surface a tooth portion brought into gear engagement with the teeth of the belt 13, whereas the rotary member 11 has a mere smooth peripheral surface. The peripheral surface of the outer belt 13 is equipped with pins or spackets 13a coming into engagement with the row of perforations 14a formed on either edge of a sheet material in the form of a recording paper 14. As shown in FIGS. 3 and 4, belt receivers 15 are formed integrally on the chassis 3b between the belt driving wheel 7 and the rotary member 11 for restricting flexure of the belt 13, and their end portions are press-fitted in the chassis 3a. A front end portion 3c of the chassis body composed of the chassis 3a and 3b is coupled with a marginal end or change portion 2a of the support frame 2 movably in the axial direction (the widthwise or lateral direction of the recording paper 14). Thus, the chassis body is movable along the drive shaft 6 without rotating about the drive shaft 6.

Figure 2:
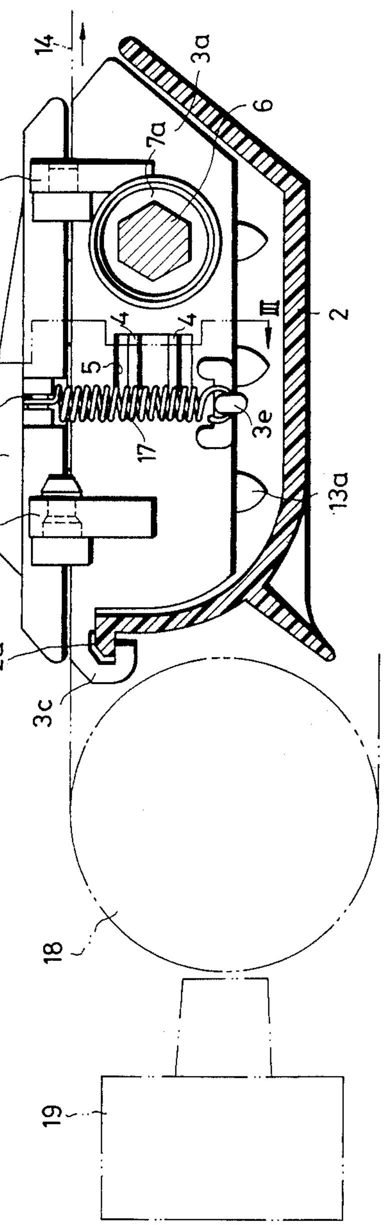
FIG. 2 is an enlarged sectional view taken along line II—II in FIG. 1.

As shown in FIGS. 2 and 3, the peripheral surface of the chassis 3a has a pair of cover receivers 3d formed thereon, and a paper holding cover 16 is attached to these cover receivers pivotably in open and close directions. The paper holding cover 16 is normally closed as illustrated by the solid line in FIG. 3, but can be opened upward to the position illustrated by the imaginary line in FIG. 3 in opposition to the spring force of a cover spring 17 at the time of setting the recording paper 14. The central portion of the paper holding cover has an elongate window hole 16a bored therein so as not to obstruct the movement of the pins 13a of the belt 13, and its back side has a plurality of ribs 16b formed thereon along the feed direction of the recording paper 14 for restricting floating-off of the recording paper 14.

In FIG. 2, reference numeral 18 designates a platen, and 19 designates a print head.

The paper tractor of the foregoing configuration can be assembled very easily in accordance with the following procedure. Namely, the belt driving wheel 7 is put on the drive shaft 6, and the chassis 3b is attached from the side of the sleeve 7b, to the chassis 3b so that this sleeve 7b is fitted in the bearing hole 9. The rotary member 11 is coupled with the shaft portion 10 of the chassis 3b. Then, the belt 13 is engaged between and around the belt driving wheel 7 and rotary member 11. Thereafter, the chassis 3a is positioned so that its coupling hole 5 confronts the coupling pawls 4, and is coupled with the chassis 3b into the form of a single body. As a result, the belt driving wheel 7, rotary member 11 and pin belt 13 can never slip from the portion between the chassis 3a and 3b. Then, the paper holding cover 16 is attached to the cover receivers 3d of the chassis 3a, and the cover spring 17 is suspended and held between a spring hook portion 3e of the chassis 3a and another spring hook portion 16c of the paper holding cover 16. Finally, the thus assembled chassis body is fitted into the support frame 2 from above. At this time, as the chassis body is pushed in forcibly into the support frames and pivotably around the drive shaft 6, the chassis body front end portion 3c formed with a groove abuts against the support frame marginal end portion 2a while being expanded outward by the inclined upper surface of the marginal end portion 2a of the support frame 2, and finally, as shown in FIG. 4, the front end portion 3c of the chassis body is slidably fitted in the marginal end portion 2a of the support frame 2. As both end portions of the drive shaft 6 are rotatably supported by the bearings (not shown) of the support frame 2, all assembly steps are completed.

Figure 8:
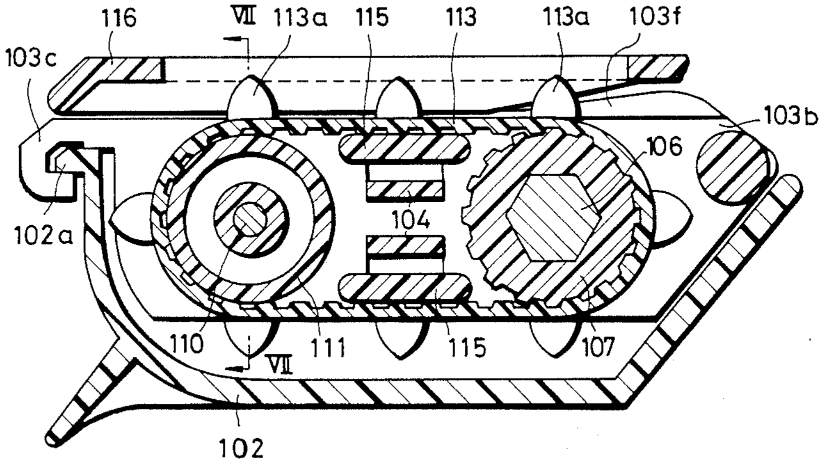
FIG. 8 is a vertical sectional view of a second embodiment of the pin belt type paper tractor according to the present invention.
Figure 9:
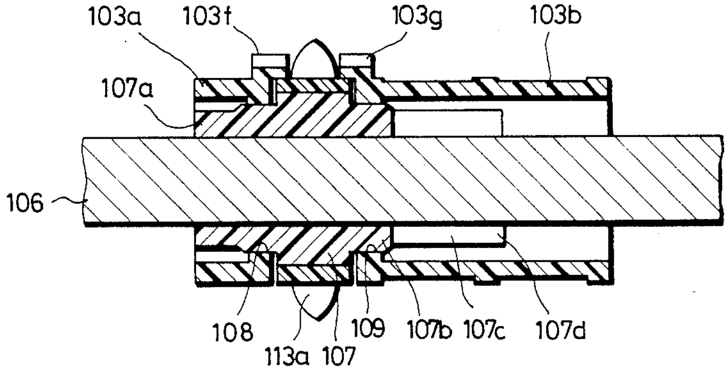
FIG. 9 is a sectional view showing the structure of a separator.

A second embodiment shown in FIGS. 8 and 9 is substantially identical in fundamental structure with the aforementioned first embodiment. According to this second embodiment, in the marginal portions of the upper surfaces (the guide surfaces for the recording paper) of both chassis 103a and 103b, separators 103f and 103g are formed projectingly at positions adjacent to the belt driving wheel 107 and the belt 113. Specifically, the separators 103f and 103g are provided projectingly so as to guide the recording paper (not shown) in the direction away from the pins 113a. Describing in greater detail, as shown in FIG. 8, each separator has a gently-sloping surface inclined and extended upwardly toward the paper and forwardly in the lengthwise direction of the paper (the left-hand side of FIG. 8) from a place above the central portion of the drive shaft 106 of the belt driving wheel 107. By this configuration, the recording paper is fed while being guided by the separators 103f and 103g so that the recording paper floats upward. Consequently, the recording paper can separate smoothly from the pins 113a even while back tension is being applied thereto.

The opposed inner side portions of both separators 103f and 103g extend upwardly above the peripheral surface (the upper surface) of the belt 113, as shown in FIG. 9. This configuration is employed to restrict floating-off of the belt 113 by means of these projecting portions even if the belt 113 is raised up by means of the recording paper engaging with the pins 113a.

The other structures not mentioned above of the second embodiment are substantially identical with those of the first embodiment, and the parts corresponding to those of the first embodiment bear the respective reference numerals of those with "100" added.

Figure 10:
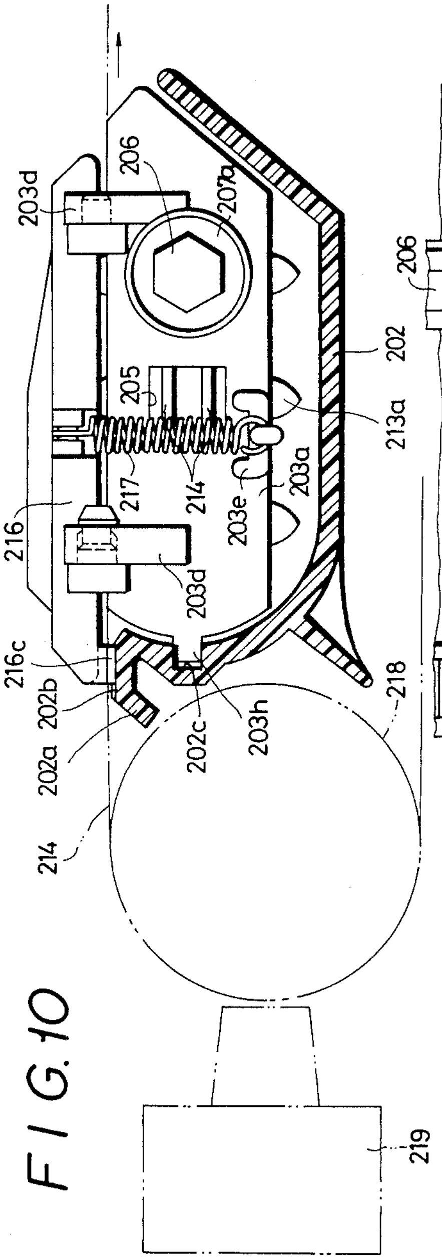
FIG. 10 is a side view, partially in cross section, of a third embodiment of the paper tractor according to the present invention.
Figure 11:
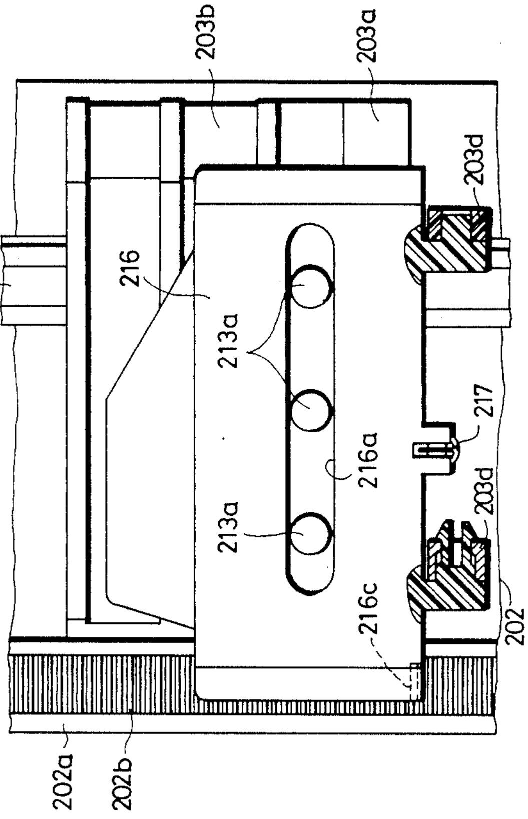
FIG. 11 is a plan view, partially in cross section, of the third embodiment.

A third embodiment will now be described with reference to FIGS. 10 and 11.

The support frame 202 has the projection portion 202a projecting therefrom, and the upper surface of this projection portion 202a has a knurled section 202b formed with a series of projections. This knurled section 202b extends in the widthwise direction of the recording paper 214, namely, along the moving direction of the tractor unit so as to confront one end portion of the paper holding cover 216. These parts are arranged so that when the paper holding cover 216 is in the closed state as shown in FIG. 10, a lock pawl 216c formed integrally on the lower surface of the end portion of the paper holding cover 216 is in engagement with the knurled section 202b, whereas when the paper holding cover 216 is in the open state (in the same state as is shown in FIG. 3) the lock pawl 216c is separated from the knurled section 202b.

The other structures not mentioned above are substantially identical with those of the first embodiment, and the parts corresponding to those of the first embodiment bear the respective reference numerals of those with "200" added.

At the time of setting the recording paper 214, the paper holding cover 214 is opened in opposition to the spring force of the cover spring 217. Under the above condition, the track unit can move in the widthwise direction of the recording paper 214. Then, the position of the tractor unit is adjusted so as to harmonize with the width of the recording paper 214, the pins 213a of the belt are inserted into the perforations of the recording paper 214, and then the paper holding cover 216 is closed as shown in FIG. 10. As a result, the lock pawl 216c of the paper holding cover 216 comes into engagement with the knurled section 202b, and the tractor unit is clamped at the thus attained position.

According to the pin belt type paper tractor described hereinabove in greater detail of the present invention, only one drive shaft is employed which passes through the chassis body and the conventional support shaft is not necessary. Thus, the present invention is not in need of a mechanism for compensating for an error in the parallel alignment between the drive shaft and the support shaft that was needed in the prior art. Accordingly, the number of parts is reduced, the structure is simplified, and the assembly work can be performed very easily and quickly.

Further, the tractor of the present invention includes the separator, thus, it is possible to achieve smoothly and surely separation of the perforations of the recording paper from the tractor-side pins, and defective paper feed can not happen even operated at a high speed.

Furthermore, according to the paper tractor of the present invention, the structure of clamping the tractor unit at a desired position can be simplified remarkably by the use of a reduced number of parts, thus can be manufactured and assembled easily. Accordingly, there can be produced the paper tractor at low costs. In addition, since the tractor unit is automatically clamped/released in response to the paper holding cover being opened/closed, it is not necessary to worry about the manipulation of clamping the tractor unit at a desired position.

It is to be understood that the present invention should be defined only by the appended claims, and various modifications may be made without departing from the technical spirit thereof.

What is claimed is:

1. A pin belt type paper tractor for feeding a recording paper, comprising:

a stationary support frame having a length not less than the width of a recording paper;

a drive shaft mounted on the support frame and rotatively driven at the time of feeding a recording paper;

a belt driving wheel fitted on the drive shaft for rotation therewith and slidably in the axial direction thereof;

a chassis body for pinching the belt driving wheel from the opposite sides thereof, the chassis body being movable in the widthwise direction of a recording paper along the drive shaft and being in slideable engagement at its peripheral portion with the stationary support frame;

a rotary member rotatably supported within the chassis body;

an endless belt engaged between and around the belt driving wheel and rotary member, the endless belt being provided on its outer surface with a plurality of pins brought into engagement with perforations of the recording paper;

a paper holding cover attached to the chassis body movably between open and closed states; and wherein the support frame has a knurled section formed thereon along the widthwise direction of the recording paper, and the paper holding cover has an end portion formed with a lock pawl which is engageable with the knurled section for positioning the chassis body relative to the support frame in the widthwise direction of the recording paper when the paper holding cover is in the closed state and disengageable from the knurled section when the paper holding cover is in the open state.

2. A pin belt type paper tractor according to claim 1; wherein the chassis body is provided on its upper surface portion with a separator projectingly formed at a position adjacent to the belt driving wheel so as to guide the recording paper in the direction away from the pins of the endless belt.

3. A pin belt type paper tractor according to claim 2; wherein the separator has a portion extending upwardly above the outer surface of the endless belt.

4. An apparatus for feeding a sheet material in the lengthwise direction thereof, the sheet material having a pair of widthwisely spaced rows of perforations, the apparatus comprising: a stationary support frame defining a space extending widthwisely of the sheet material; a drive shaft rotatably disposed within the support frame space and extending widthwisely of the sheet material; a pair of feeding means disposed within the support frame space for engagement with the respective rows of perforations and driven by the drive shaft for feeding the sheet material in the lengthwise direction thereof, the pair of feeding means being mounted slideably along the drive shaft such that the pair of feeding means are guided relative to the sheet material in the widthwise direction solely by means of the drive shaft so as to adjustably align with the respective rows of perforations, each of the feeding means comprising a chassis body for slideably receiving therethrough the drive shaft, the chassis body having an upper surface for receiving thereon the sheet material, a driving wheel rotatably disposed within the chassis body and fitted on the drive shaft for rotation therewith, a rotary member rotatably disposed within the chassis body in radially spaced relation to the driving wheel, an endless belt engaged between the driving wheel and rotary member, the endless belt having a series of sprockets disposed on an outer surface of the endless belt and protruding upwardly from the chassis body upper surface for the engagement with the row of perforations, and a cover portion movable relative to the chassis body upper surface between open and closed positions, the cover portion being operative when moved to the closed position to slideably hold the sheet material between the cover portion and the chassis body upper surface; coupling means for coupling the feeding means and the support frame to each other to fix the feeding means in alignment with the respective rows of perforations within the support frame space; and wherein the stationary support frame has a knurled section extending in the sheet material widthwise direction, and the chassis body cover portion has a lock pawl engageable with the stationary support frame knurled section when the cover portion is moved to the closed position.

5. An apparatus according to claim 4; wherein the chassis body has a slanting portion formed on the upper surface thereof and slanting upwardly toward the sheet material and forwardly in the sheet material lengthwise direction for guiding the loaded sheet material away from the sprockets to facilitate the disengagement of the sheet material from the sprockets.

6. An apparatus according to claim 4; wherein the coupling means comprises a flange formed on a periphery of the support frame and extending in the sheet material widthwide direction, and a groove formed in a periphery of each chassis body and engageable with the flange when the chassis body is pressed into the support frame space pivotably around the drive shaft.

* * * * *